March 17, 1964  E. E. McDOWELL  3,125,016
COMBINATION BARBECUE GRILL AND STEAM ACTUATED ROTISSERIE
Filed March 1, 1961
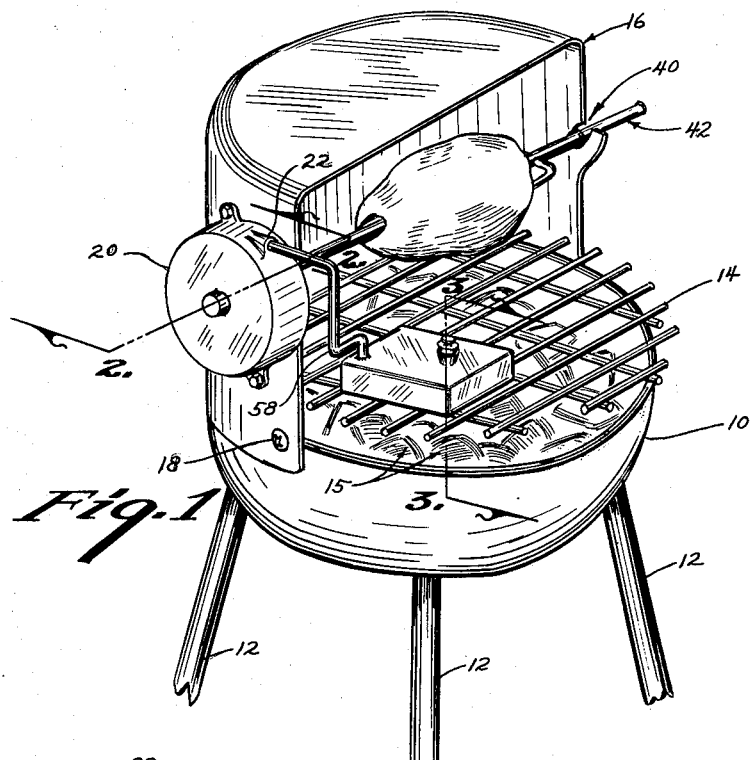
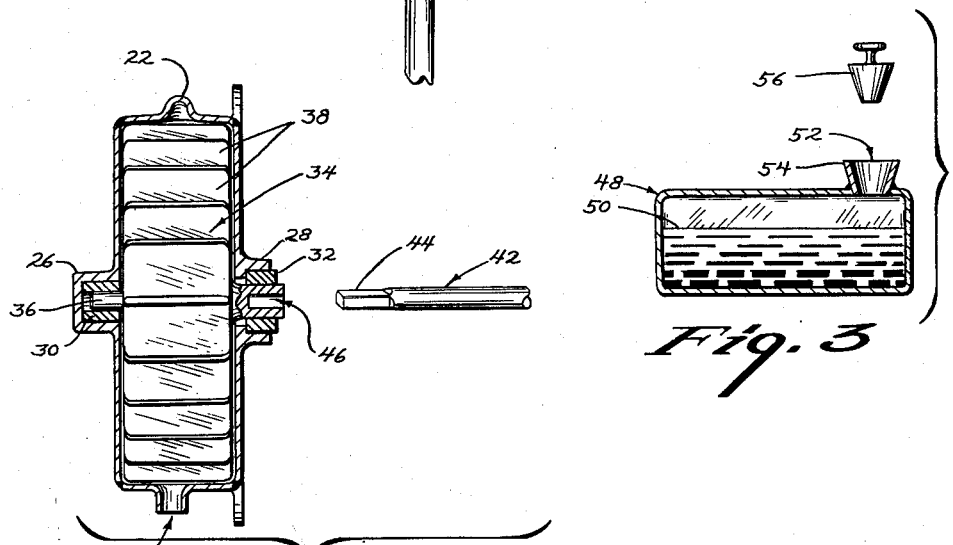
INVENTOR.
EARL E. McDOWELL
BY
ATTORNEYS
WITNESS
NORMAN G. TRAVISS

United States Patent Office 3,125,016
Patented Mar. 17, 1964

3,125,016
COMBINATION BARBECUE GRILL AND STEAM
ACTUATED ROTISSERIE
Earl E. McDowell, Perry, Iowa
Filed Mar. 1, 1961, Ser. No. 92,611
4 Claims. (Cl. 99—421)

My invention relates to cooking devices and more particularly to a device used in outdoor cooking.

The backyard barbecue grill has become increasingly popular in recent years and a desirable accessory to the grill is an electrically operated rotisserie. These rotisseries permit the preparation of special dishes and the practicing of special types of cooking which would not otherwise be possible. The great shortcoming of these electrically operated rotisseries is that a source of power is not always available, particularly on camping trips, picnics and the like. Many times, long electrical extension cords are run from houses to these rotisseries, but this is often inconvenient and involves a certain element of danger, particularly when the cords are placed on a ground surface that is wet or damp. The cords also present somewhat of a hazard when small children are playing in the area.

Therefore, the principal object of my invention is to provide a rotisserie that can be operated without the use of electrical power by utilizing heat from the attached barbecue grill.

More specifically, it is an object of my invention to provide a steam actuated rotisserie in combination with a barbecue grill.

A further object of my invention is to provide a combination barbecue grill and steam actuated rotisserie which is completely safe to use.

A further object of my invention is to provide a combination barbecue grill and steam actuated rotisserie which is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a partial perspective view of my device;

FIG. 2 is a schematic view of my turbine and rotisserie rod as viewed on line 2—2 of FIG. 1; and FIG. 3 is a sectional view of my water reservoir taken on line 3—3 of FIG. 1.

I have used the numeral 10 to generally designate a bowl-shaped charcoal container with three downwardly extending legs 12. A grill 14 can rest on the top of container 10 or be otherwise secured thereto. Container 10 is adapted to hold combustible charcoal elements 15.

A hood element 16 extends upwardly from container 10 and is secured thereto in any convenient fashion such as by metal screws 18. A cylindrical steam turbine housing 20 is bolted to the outside of hood element 16. Housing 20 has a steam intake port 22 and an outlet port 24 located at a point remote therefrom. Shoulders 26 and 28 on housing 20 receive hollow bearing elements 30 and 32, respectively. A conventional steam turbine rotor 34 with a center shaft 36 is rotatably mounted within housing 20. As shown in FIG. 2, one end of rotor shaft 36 is rotatably received in bearing 30 and the other end is rotatably received in bearing 32. Rotor blades 38 radiate outwardly from rotor shaft 36 and the rotor is adapted to rotate on the shaft when steam is introduced into housing 20 through intake port 22 and allowed to be exhausted through outlet port 24.

An open slot 40 appears in hood 16 at a point opposite to turbine housing 20 as shown in FIG. 1. Slot 40 is in substantial axial alignment with rotor shaft 36 and serves as a bearing support for one end of rotisserie rod 42. As shown in FIG. 2, end 44 of rotisserie rod 42 is rectangular in cross section and is adapted to be received in the opening 46 in the end of rotor shaft 36 that is mounted in bearing 32. Opening 46 is also rectangular in cross section and the reception of end 44 of rotisserie rod 42 therein enables the rotor 34 to impart rotational movement to the rod 42 about its own longitudinal axis. A fowl or meat substance 47 can be mounted on rotisserie rod 42 in conventional fashion.

A closed container 48 is capable of receiving a quantity of water 50 through an access opening 52. An upwardly and outwardly extending collar 54 surrounds opening 52 and is adapted to receive a relatively heavy metal sealing plug 56 which is tapered to correspond to the tapered shape of the collar. A flexible tube 58 is secured in any convenient fashion by one of its ends to the top of container 48 to communicate with the interior of housing 20. The other end of tube 58 is adapted to be forcibly but detachably inserted into steam intake port 22 on housing 20.

The normal operation of my device is as follows: When it is desired to use the rotisserie rod 42, the meat substance 47 can be placed on the rod and the rod can then be placed on my unit by inserting end 44 thereof into the opening 46 of rotor shaft 36. The other end of rod 42 is supported in slot 40.

Water 50 can then be placed within container 48 and the container can then be placed on grill 14 above the ignited charcoal 15. Sealing plug 56 should be inserted within opening 52 to seal the container from the outside atmosphere. The free end of tube 58 can be inserted into the steam intake port 22 of housing 20. Since tube 58 is flexible, container 48 can be located at any convenient point on grill 14, and can be completely removed therefrom when the turbine is not being used to free the entire area of the grill for cooking purposes.

As the heat rises from the burning charcoal 15, steam is created in the upper portion of the container 48 and as the steam pressure increases, the steam proceeds through the tube 58, into housing 20 though intake port 22, and then through the housing and the outlet port 24. In conventional fashion, the passage of steam through the tangentially positioned intake port 22 to the outlet port 24 will impart rotational motion to rotor 34 by acting against rotor blades 38. As described above, the rotor 34 will thus impart rotational motion to the rotisserie rod 42 which is detachably secured to the rotor.

If an excessive amount of steam pressure is created within container 48, sealing plug 56 will be unseated by this pressure and will allow steam to escape so as to prevent any explosion of the container. Similarly, if the speed of rotation of rotor 34 and rod 42 is too great, the operator can reduce the steam pressure by briefly removing sealing plug 56 from collar 54.

Thus, from the foregoing, it is seen that my device will accomplish at least all of its stated objectives.

Some changes may be made in the construction and arrangement of my combination barbecue grill and steam actuated rotisserie without departing from the real spirit and purpose of my invention, and it is my intention to cover by my claims, any modified forms of structure or use of mechanical equivalents which may be reasonably included within their scope.

I claim:

1. In a device of the class described,
    a supporting container adapted to hold ignited charcoal and the like,
    a horizontal grill secured to said container and extending over the top thereof,
    a hood means secured to said container and extending upwardly and over at least a portion of said container,
    a steam turbine means including a turbine rotor adapted to provide rotational power, secured to said hood means,
    a horizontally disposed rotisserie rod mounted on said hood means and being operatively connected to said turbine rotor whereby said rotor can impart rotational motion to said rotisserie rod,
    a closed reservoir container adapted to hold water detachably and movably resting above and on top of said grill,
    a flexible tube connecting said closed reservoir container with said steam turbine whereby steam created in said reservoir by ignited charcoal in said container can impart rotational movement to said turbine rotor,
    said reservoir container being free from engagement with said supporting container,
    said flexible tube being the only means of connection between said reservoir container and said steam turbine.

2. In a device of the class described,
    a supporting container adapted to hold ignited charcoal and the like,
    a horizontal grill secured to said container and extending over the top thereof,
    a hood means secured to said container and extending upwardly and over at least a portion of said container,
    a steam turbine means including a turbine rotor adapted to provide rotational power, secured to said hood means,
    a horizontally disposed rotisserie rod mounted on said hood means and being operatively connected to said turbine rotor whereby said rotor can impart rotational motion to said rotisserie rod,
    a closed reservoir container adapted to hold water detachably and movably resting above and on top of said grill,
    a flexible tube connecting said closed reservoir container with said steam turbine whereby steam created in said reservoir by ignited charcoal in said container can impart rotational movement to said turbine rotor,
    said flexible tube being the only means of connection between said reservoir container and said steam turbine.

3. In a device of the class described,
    a supporting container adapted to hold ignited charcoal and the like,
    a horizontal grill secured to said container and extending over the top thereof,
    a hood means secured to said container and extending upwardly and over at least a portion of said container,
    a steam turbine means including a turbine rotor adapted to provide rotational power, secured to said hood means,
    a horizontally disposed rotisserie rod mounted on said hood means and being operatively connected to said turbine rotor whereby said rotor can impart rotational motion to said rotisserie rod,
    a closed reservoir container adapted to hold water detachably and movably resting above and on top of said grill,
    a flexible tube connecting said closed reservoir container with said steam turbine whereby steam created in said reservoir by ignited charcoal in said container can impart rotational movement to said turbine rotor,
    said reservoir container being free from engagement with said supporting container.

4. In a device of the class described,
    a supporting container adapted to hold ignited charcoal and the like,
    a horizontal grill secured to said container and extending over the top thereof,
    a hood means secured to said container and extending upwardly and over at least a portion of said container,
    a steam turbine means including a turbine rotor adapted to provide rotational power, secured to said hood means,
    a horizontally disposed rotisserie rod mounted on said hood means and being operatively connected to said turbine rotor whereby said rotor can impart rotational motion to said rotisserie rod,
    a closed reservoir container adapted to hold water detachably and movably resting above and on top of said grill,
    a flexible tube connecting said closed reservoir container with said steam turbine whereby steam created in said reservoir by ignited charcoal in said container can impart rotational movement to said turbine rotor.

References Cited in the file of this patent

UNITED STATES PATENTS

| | | |
|---|---|---|
| 1,336,599 | Tsekuras | Apr. 13, 1920 |
| 2,797,633 | Goodwin | July 2, 1957 |
| 2,804,012 | Dong | Aug. 27, 1957 |
| 2,813,478 | Popple | Nov. 19, 1957 |